United States Patent
Apostolopoulos et al.

(10) Patent No.: US 10,652,800 B2
(45) Date of Patent: May 12, 2020

(54) MMWAVE FOR MOBILE DATA

(71) Applicant: Cisco Technology, Inc., San Jose, CA (US)

(72) Inventors: John Apostolopoulos, Palo Alto, CA (US); John M. Graybeal, Califon, NJ (US); Louis Gwyn Samuel, Swindon (GB); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/414,977

(22) Filed: May 17, 2019

(65) Prior Publication Data

US 2019/0274085 A1    Sep. 5, 2019

Related U.S. Application Data

(63) Continuation of application No. 15/846,235, filed on Dec. 19, 2017, now Pat. No. 10,341,931.

(51) Int. Cl.
| | |
|---|---|
| *H04W 40/20* | (2009.01) |
| *H04L 29/08* | (2006.01) |
| *H04W 40/02* | (2009.01) |
| *H04W 4/70* | (2018.01) |
| *H04W 4/029* | (2018.01) |
| *H04W 4/40* | (2018.01) |

(52) U.S. Cl.
CPC ............ *H04W 40/20* (2013.01); *H04L 67/06* (2013.01); *H04L 67/18* (2013.01); *H04L 67/2847* (2013.01); *H04W 4/029* (2018.02); *H04W 4/40* (2018.02); *H04W 4/70* (2018.02); *H04W 40/026* (2013.01)

(58) Field of Classification Search
CPC ....... H04W 40/20; H04W 4/70; H04W 4/029; H04W 40/026; H04W 4/40; H04L 67/2847; H04L 67/06; H04L 67/18
See application file for complete search history.

(56) References Cited

U.S. PATENT DOCUMENTS

| | | | |
|---|---|---|---|
| 7,782,251 B2 | 8/2010 | Bishop et al. | |
| 8,493,234 B2 | 7/2013 | McNamara et al. | |

(Continued)

OTHER PUBLICATIONS

International Search Report and Written opinion in counterpart International Application No. PCT/US2018/065072, dated Mar. 27, 2019, 12 pages.

(Continued)

*Primary Examiner* — Julio R Perez

(57) ABSTRACT

In one embodiment, a system includes: a download server instantiated on a computing device, and a multiplicity of wireless access points (APs), where the download server is operative to: receive a download request from a mobile device, determine a current location for the mobile device, predict a route for the mobile device based at least on the current location, allocate at least one target AP along the route from among the multiplicity of wireless APs, and in response to the download request, forward at least one download file to the at least one target AP, where the at least one target AP is operative to: receive the at least one download file, identify the mobile device, and download at least part of the download file to the mobile device in an mmWave transmission.

20 Claims, 5 Drawing Sheets

(56) References Cited

U.S. PATENT DOCUMENTS

| | | | |
|---|---|---|---|
| 9,550,494 B2 | 1/2017 | Aso | |
| 9,629,171 B2 | 4/2017 | Roy et al. | |
| 2013/0053054 A1* | 2/2013 | Lovitt | H04W 4/029 |
| | | | 455/456.1 |
| 2014/0194192 A1* | 7/2014 | Pierce, II | G07F 17/3244 |
| | | | 463/25 |
| 2014/0250468 A1 | 9/2014 | Barr et al. | |
| 2014/0302844 A1* | 10/2014 | Shaw | H04W 48/17 |
| | | | 455/432.1 |
| 2015/0071173 A1 | 3/2015 | Brech | |
| 2015/0092676 A1 | 4/2015 | Periyalwar et al. | |
| 2017/0018187 A1 | 1/2017 | Kim et al. | |
| 2019/0306677 A1* | 10/2019 | Basu | H04W 4/06 |
| 2019/0340876 A1* | 11/2019 | Northrup | H04L 67/125 |

OTHER PUBLICATIONS

Extreme Networks; Wireless AP 3916; 2017 available on the web at: http://www.extremenetworks.com/product/ap3916/.

802.11ad-2012—IEEE Standard for Information technology—Telecommunications and information exchange between systems—Local and metropolitan area networks—Specific requirements; "Part 11: Wireless LAN Medium Access Control (MAC) and Physical Layer (PHY) Specifications Amendment 3: Enhancements for Very High Throughout in the 60 GHz Band"; Dec. 28, 2012.

Choi, J. et al.; "Millimeter-Wave Vehicular Communication to Support Massive Automotive Sensing," in IEEE Communications Magazine, vol. 54, No. 12. pp. 160-167, Dec. 2016.

* cited by examiner

MMWAVE FOR MOBILE DATA

CROSS-REFERENCE TO RELATED APPLICATION

This application is a continuation of U.S. patent application Ser. No. 15/846,235, filed Dec. 19, 2017, the entire contents of which are incorporated herein by reference.

TECHNICAL FIELD

The present disclosure generally relates to high speed download/upload of data in a mobile environment.

BACKGROUND

The operation of connected vehicles typically entails vehicle to infrastructure (V2I) communication to facilitate data transfer. For example, V2I communication may include traffic information, routing recommendations, local three dimensional maps downloaded to a vehicle for autonomous driving, software/firmware downloads, and/or simply infotainment content. V2I communication may also include large uploads, such as automobile videos for remote tuning of autonomous driving algorithms.

One of the options being considered for V2I communication is using the millimeter wave spectrum (mmWave). mmWave is the band of spectrum between 30 GHz and 300 GHz. Examples of existing standardized technologies that may be applied in that band of spectrum may include the IEEE (Institute of Electrical and Electronics Engineers) 802.11ad and 802.11ay Wi-Fi standards (operating at 60 GHz), for high-speed wireless communications.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

Figure 1:
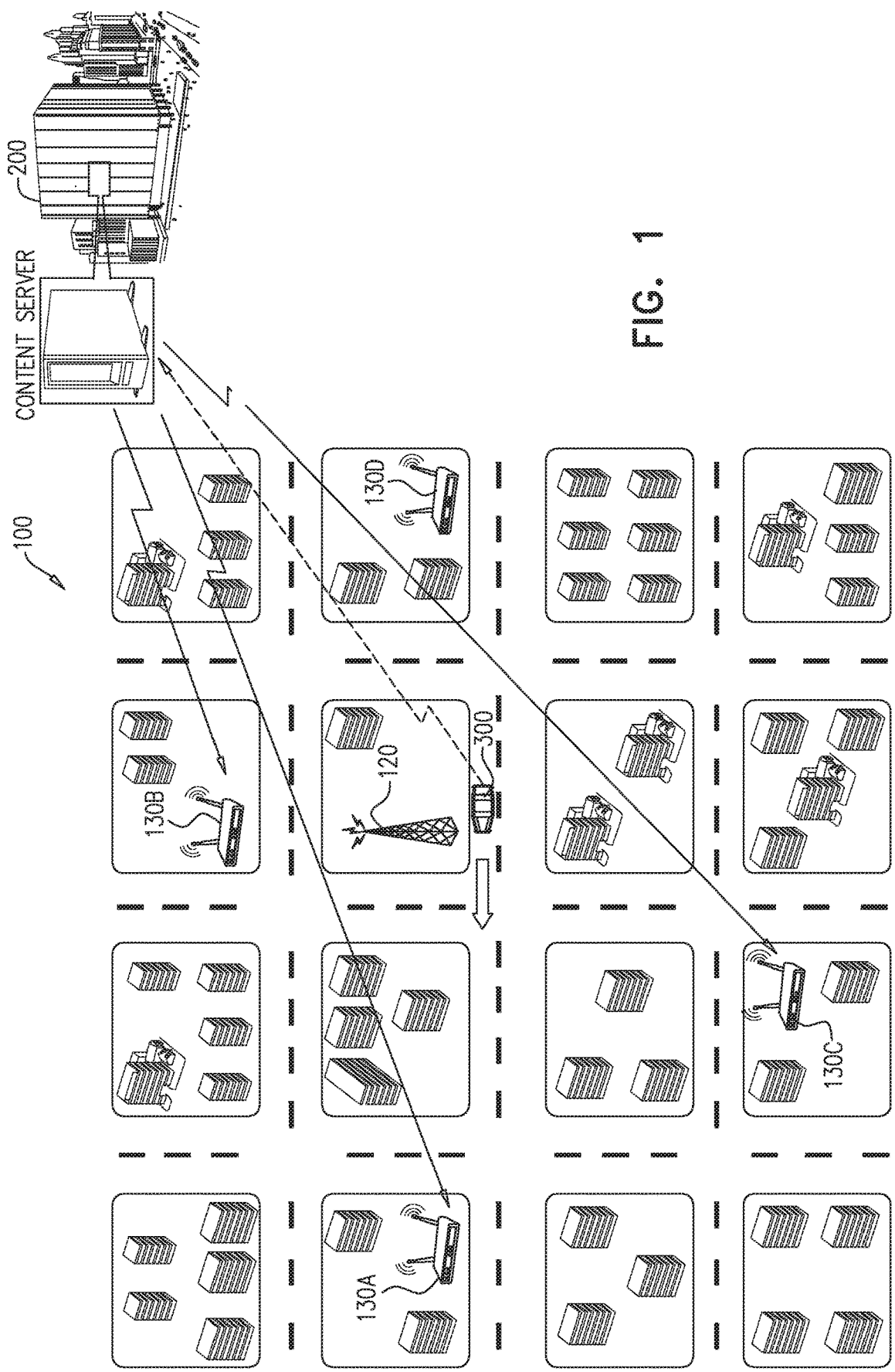
FIG. 1 is a pictorial illustration of a high speed vehicle to infrastructure (V2I) system, constructed and operative in accordance with embodiments described herein.

A system includes: a download server instantiated on a computing device, and a multiplicity of wireless access points (APs), where the download server is operative to: receive a download request from a mobile device, determine a current location for the mobile device, predict a route for the mobile device based at least on the current location, allocate at least one target AP along the route from among the multiplicity of wireless APs, and in response to the download request, forward at least one download file to the at least one target AP, where the at least one target AP is operative to: receive the at least one download file, identify the mobile device, and download at least part of the download file to the mobile device in an mmWave transmission.

A mobile communications device includes: processing circuitry, at least one input/output (I/O) module, at least one location service to be executed by the processing circuitry and operative to provide at least an indication of a current location for the mobile communications device, and an upload/download manager to be executed by the processing circuitry and operative to: send a download request for a data download to a download server via the at least one I/O module, where the download request includes the at least an indication of a current location, provide identity details for at least one mmWave enabled access point, where at least a portion of the data download is cached at the mmWave enabled access point in response to the download request, and after the mobile communications device moves from the current location, receive the at least a portion of the data download in an mmWave transmission from the at least one mmWave enabled access point via the at least one I/O module.

DETAILED DESCRIPTION OF EXAMPLE EMBODIMENTS mmWave's large spectrum bandwidth supports the transfer of large data bursts such as those associated with V2I communication. It will be appreciated that mmWave's narrowly focused directional beams may also be advantageous in V2I communication; the transmitted mmWave signal has a beam width analogous to a flashlight which may therefore limit interference (e.g., provide spatial reuse). However, providing ubiquitous coverage with mmWave may be challenging due to its propagative characteristics, as it exhibits strong fading, shadowing, and/or absorption behavior. Therefore, obtaining high coverage for large areas may imply the use of excessive resources due to a large number of small cells required to provide blanket coverage.

It will be appreciated that for at least some V2I scenarios, an acceptable level of wireless service may be provided by leveraging high speed transmission rates provided in the context of non-ubiquitous coverage. For example, in scenarios where real time, uninterrupted communication, is not necessary, high speed burst transmissions may be sufficient to provide large data downloads when possible on a non-continuous basis, i.e., where the recipient device is not necessarily in continuous connection with the data source. In accordance with embodiments described herein, mmWave may be deployed to provide wireless service from a set of not necessarily overlapping access points (APs), thereby providing high rate V2I service to moving vehicles or devices without ubiquitous coverage.

Reference is now made to FIG. 1 which a pictorial illustration of a high speed vehicle to infrastructure (V2I) system 100, constructed and operative in accordance with embodiments described herein. System 100 comprises mobile base station 120 and mmWave access points 130A, 130B, 130C, and 130D (collectively referred to herein as access points 130) which communicate with content server 200 over one or more communications networks, such as, for example, a mobile communications network and/or the Internet. The mobile communications network may include mobile networks using standards such as, for example, 3rd Generation Partnership Project (3GPP), Long Term Evolution (LTE), Fifth Generation (5G), etc.

As depicted in FIG. 1, mmWave enabled vehicle 300 (hereinafter vehicle 300) may be moving along roads in the overall coverage area of system 100. In accordance with an exemplary embodiment described herein, vehicle 300 may comprise an integrated mobile communications device operative to communicate with content server 200 via mobile base station 120. It will be appreciated that mobile base station 120 may be implemented as any suitable device such as, for example, an eNodeB, NodeB, gNB, femtocell, microcell, etc. Content server 200 may represent any server operative to provide a large data downloads to vehicle 300, such as, for example, traffic information, routing recommendations, local three-dimensional (3D) maps for autonomous driving, software/firmware downloads, infotainment content, etc. In accordance with the exemplary embodiment of FIG. 1, vehicle 300 may request a large data download from content server. For example, vehicle 300 may request a one gigabit 3D map file for a map segment that vehicle 300 is approaching.

It will be appreciated that there may not be enough available bandwidth in the mobile communications network to download the requested 1 GB file while vehicle 300 passes within range of a given access point 130. It will similarly be appreciated that the requested download may be serviced in non-real time; some delay may be tolerable before receiving the download. For example, the requested 3D map file may be for a map segment that is a mile away from vehicle 300. Similarly, if the download request is for a download for a software/firmware update, the update may not be performed until a later time when vehicle 300 is not in use.

In order to facilitate the requested download, content server 200 may forward the file (or files) to be downloaded to one or more of access points 130 for download to vehicle 300 using mmWave. In accordance with the exemplary embodiment of FIG. 1, vehicle 300 may be configured with global positioning satellite (GPS) and/or navigational software which may by leveraged by system 200 to predict a route for vehicle 300. For example, as shown by the arrow in FIG. 1, per the information received from onboard systems on vehicle 300, vehicle 300 may be headed towards access point 130A.

Accordingly, content server 200 may use known technologies (for example, the Internet) to forward the requested download to access point 130A; access point 130A may then download the file(s) to vehicle 300 when it comes within range. It will be appreciated that when selecting an access point 130 for caching the requested download, in order to cache the requested download before vehicle 300 comes into range, the speed of vehicle 300 may also be considered in addition to the direction it is moving.

Alternatively, in the absence of predictive information regarding a direction that vehicle 300 is moving in (for example, vehicle 300 may be parked), content server 200 may forward the requested download to multiple access points 130. For example, content server 200 may forward the download to access points 130A, 130B, 130C, and 130D, thereby increasing the likelihood that vehicle 300 will come within range of at least one access point 130 with the file(s) cached and ready for download.

It will be appreciated that access points 130 may not provide complete coverage of the area serviced by system 100. For example, access points 130 may be deployed to provide service for vehicle 300 as it passes through intersections near an access point 130. In fact, the current location of vehicle 300 as depicted in FIG. 1 may not be in the coverage area of any of access points 130. However, for non-real time downloads, a non-ubiquitous deployment where the service provider does not seek to provide coverage for every point in a given service area may be sufficient. By providing wireless service at key locations within the service area, such a non-ubiquitous deployment may provide sufficient service even if less than 1% of the overall service area is actually actively covered by access points 130.

Figure 2:
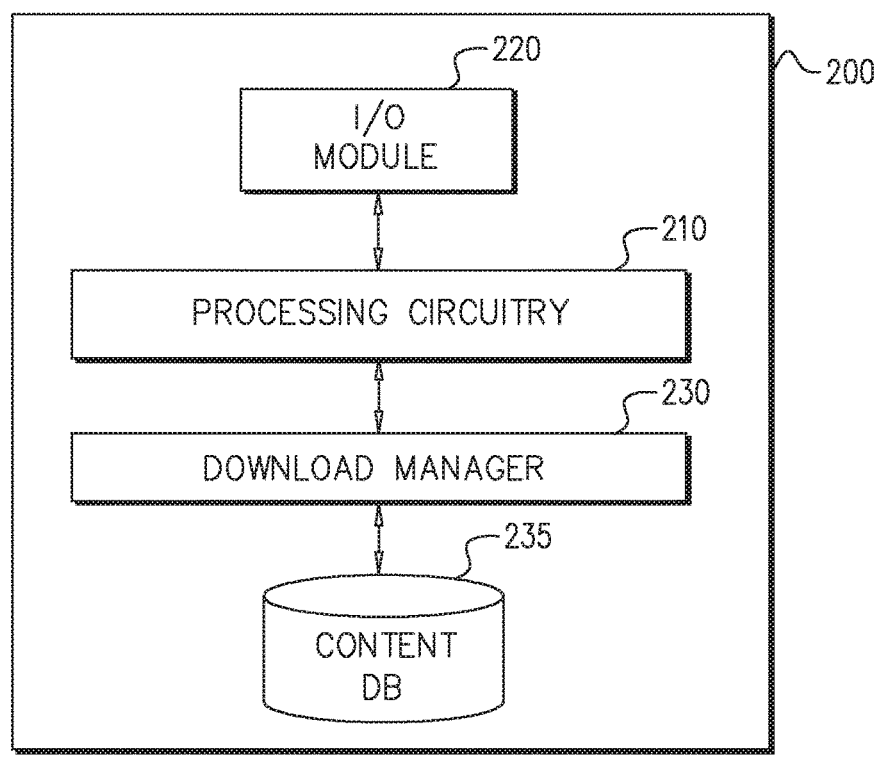
FIG. 2 is a block diagram of an exemplary V2I server from the system of FIG. 1.

Reference is now made also to FIG. 2 which is a block diagram of an exemplary V2I server 200 such as content server 200 from system 100 in FIG. 1. Server 200 comprises processing circuitry 210, input/output (I/O) module 220, download manager 230, and content database 235. download manager 230 and content database 235 may be implemented using any suitable memory for storing software and/or operational data, such as an optical storage medium, a magnetic storage medium, an electronic storage medium, and/or a combination thereof. It will be appreciated that the memory, or parts thereof, may be implemented as a physical component of server 200 and/or as a physical component of one or more secondary devices in communication with server 200. It will also be appreciated that in the interests of clarity, while server 200 may comprise additional components and/or functionality, such additional components and/or functionality are not depicted in FIG. 2 and/or described herein.

Processing circuitry 210 may be operative to execute instructions stored in the memory. For example, processor 210 may be operative to execute download manager 230. It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 200 may comprise more than one instance of processing circuitry 210. For example, one such instance of processing circuitry 210 may be a special purpose processor operative to execute download manager 230 to perform some, or all, of the functionality of server 200 as discussed with respect to FIG. 1.

I/O module 220 may be any suitable software or hardware component such as a universal serial bus (USB) port, disk reader, modem or transceiver that may be operative to use protocols such as are known in the art to communicate either directly, or indirectly, with other elements of system 100, such as, for example, wireless access points 130 and/or mobile base station 120. For example, I/O module 220 may be operative to use a backbone network or the Internet, etc. to connect to the other elements of system 100. It will be appreciated that in operation I/O module 220 may be implemented as a multiplicity of modules, where different modules may be operative to use different communication technologies.

It will also be appreciated that the embodiments described herein may also support configurations where some or all of the communications between I/O module 220 and elements of system 100 are brokered by one or more intermediary servers in system 100; at least some of the functionality attributed herein to server 200 may be also performed on such an intermediary server. It will similarly be appreciated that since I/O module 220 is operative to communicate with the other elements of system 100, the physical location of server 200 may not necessarily be within close proximity of any specific element(s) of system 100.

Download manager 230 may be an application implemented in hardware, firmware, or software that may be executed by processing circuitry 210 to at least provide the functionality of server 200 as described herein to facilitate high speed data downloads to vehicle 300.

Figure 3:
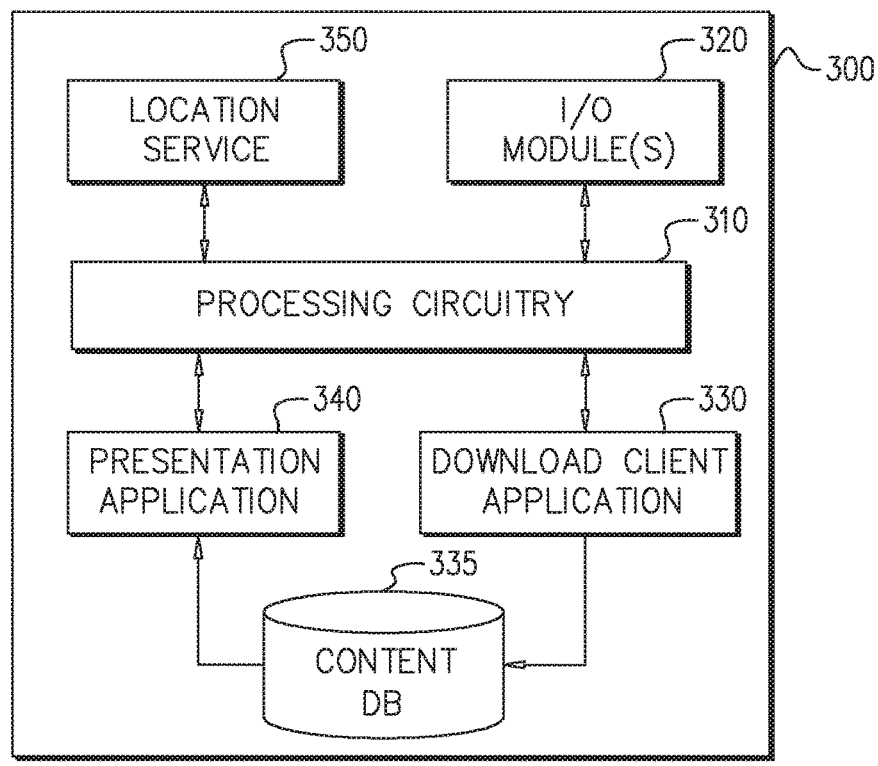
FIG. 3 is a block diagram of an exemplary vehicular device from the system of FIG. 1.

Reference is now made also to FIG. 3 which is a block diagram of an exemplary mmWave enabled vehicle 300 (hereinafter vehicle 300) from the system of FIG. 1, configured and operative in accordance with embodiments described herein to receive high speed downloads from server 200. Vehicle 300 may be instantiated using any suitable computing device(s) that may support the embodiments as described herein. For example, vehicle 300 may implemented using hardware, software, and/or firmware integrated in an onboard computer system. Alternatively, at least some of the functionality of vehicle 300 may be implemented using one or more peripheral devices (e.g., multi-purpose personal computer, laptop computer, computer tablet, smartphone, and/or Internet of Things (IoT) device) located with vehicle 300.

Vehicle 300 comprises processing circuitry 310, input/output (I/O) module 320, download client application 330, content database 335, processing application 340, and location service 350. Content database 335 may be implemented using any suitable memory for storing software and/or operational data, such as an optical storage medium, a magnetic storage medium, an electronic storage medium, and/or a combination thereof. It will be appreciated that the memory, or parts thereof, may be implemented as a physical component of vehicle 300 and/or as a physical component of one or more secondary devices in communication with vehicle 300. It will be appreciated that in the interests of clarity, while vehicle 300 may comprise additional components and/or functionality (e.g., to function as a vehicle), such additional components and/or functionality are not depicted in FIG. 3 and/or described herein.

Processing circuitry 310 may be operative to execute instructions stored in the memory. For example, processor 310 may be operative to execute download client application 330, processing application 340, and/or location service 350. It will be appreciated that processing circuitry 310 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that vehicle 300 may comprise more than one instance of processing circuitry 310. For example, one such instance of processing circuitry 310 may be a special purpose processor operative to execute download client application 330, processing application 340, and/or location service 350 to facilitate some or all of the functionality for facilitating high speed data downloads on vehicle 300 as discussed with respect to FIG. 1.

I/O module 320 may be any suitable software or hardware component such as a modem or transceiver that may be operative to use protocols such as are known in the art to communicate either directly, or indirectly, with at least server 200 and access points 130. For example, I/O module 320 may be operative to use a backbone network and/or the Internet to communicate with server 200 and/or access points 130. It will be appreciated that in operation I/O module 320 may be implemented as a multiplicity of modules, where different modules may be operative to use different communication technologies. For example, one such module may be operative to communicate with server 200 via mobile base station 120 over a mobile network. Another such module may be operative to communicate with access points 130 via mmWave. In some embodiments, another such module may be operative to communicate with server 200 and/or access points 130 via WiFi.

It will also be appreciated that the embodiments described herein may also support configurations where some or all of the communications between I/O module 320 and other elements of system 100 (e.g., mobile base station 120, access points 130, etc.) are brokered by an intermediary server in system 100; the embodiments described herein are not limited to direct communications between I/O module 320 and any specific components of system 100. It will be appreciated that at least some of the functionality attributed herein to server 300 may be also performed on such a local server. In some embodiments, I/O module 320 may communicate with the intermediary server via WiFi or any other suitable radio technology.

In accordance with some embodiments described herein, download client application 330, processing application 340, and/or location service 350 may be implemented as integrated hardware, firmware, and/or software components of vehicle 300. In accordance with some other embodiments described herein, one or more of download client application 330, processing application 340, and/or location service 350 may be implemented as peripheral components of vehicle 300, using hardware, firmware, or software.

Download client application 330 may be configured to be executed by processing circuitry 310 to initiate and manage downloads requested from server 200 and received from access points 130. Processing application 340 may be an application configured to process the requested download. For example, processing application 340 may be a media player operative to play media content received from server 200. Processing application may alternatively be implemented as an autonomous driving system on vehicle 300. It will be appreciated that processing application 340 may be implemented as any suitable application operative to process the requested download. Location services 350 may be a service or application operative to provide at least an indication of a current location and/or direction for vehicle 300. For example, location service 350 may be implemented as a global positioning satellite (GPS) service or a navigation service.

Figure 4:
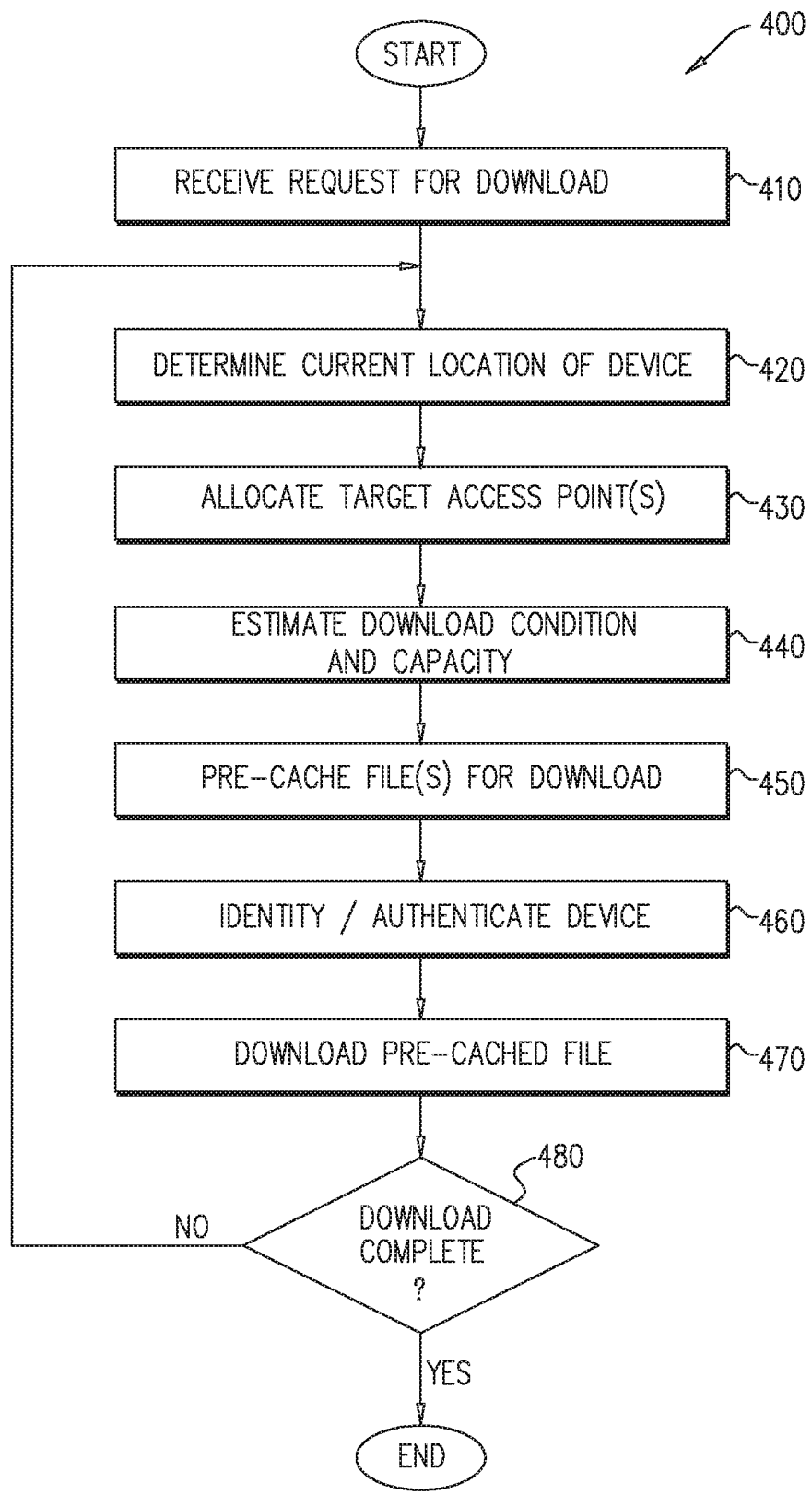
FIG. 4 is a flowchart of an exemplary download process to be performed by the system of FIG. 1.

Reference is now made also to FIG. 4 which is a flowchart of an exemplary download process to be performed by the system of FIG. 1. Server 200 may receive (step 410) a request for a download from vehicle 300. As described hereinabove, the requested download may be, for example, traffic information, routing recommendations, local three dimensional (3D) maps downloaded to a vehicle for autonomous driving, software/firmware downloads, and/or simply infotainment content.

A delay of some length of time may be expected for the fulfillment of the download request of step 410; a non-real time performance of the requested download may not be problematic for the continuing performance of vehicle 300. For example, processing application 330 may be operative to provide autonomous driving by vehicle 300. Processing application 330 may therefore periodically send server 200 a download request for new 3D maps as it nears the border of an area for which 3D maps have already been downloaded and stored in content database 335. Accordingly, while the receipt of the requested download may be critical for ongoing continued performance of processing application 330, some time lag before receiving the requested download may be acceptable; specifically, as long as the 3D maps are received before vehicle 300 continues to an area for which it does not have an appropriate 3D map.

Server 200 may determine (step 420) a current location for vehicle 300. For example, the download request in step 410 may include location information from location service 350; server 200 may use the location information to perform step 420. Server 200 may also use location information received from mobile base station 120 in addition to, or instead of, location information from location service 350.

Based on the location as determined in step 420, server 200 may allocate (step 430) one or more access points 130 as targets along a predicted path for vehicle 300. In accordance with some embodiments described herein, server 200 may use directional information received from location service 350 to predict a direction and/or destination for vehicle 300. Alternatively, or in addition, server 200 may also use hand over history between mobile base station 120 and other mobile base stations in a same mobile communication network to predict a direction and/or speed for vehicle 300.

For example, as per the exemplary embodiment of FIG. 1, server 200 may determine based on input from location service 350 that vehicle 300 is moving in the direction of access point 130A; server 200 may therefore allocate access point 130A as a target access point 130 to perform the requested download. In accordance with another exemplary embodiment, at the time of the download request, vehicle 300 may be stationary and not using location service 350. Server 200 may therefore allocate access points 130 in the general area of vehicle 300 as determined by the location of mobile base station 120. E.g., access points 130A, 130B, 130C, and 130D. In accordance with yet another exemplary embodiment, server 200 may receive a current location for vehicle 300 from location service 350 without an indication of a next direction, e.g., GPS may be active in location service 350, but there may not be a navigational route currently selected for vehicle 300. However, information received from mobile based station 120 may indicate that vehicle 300 had recently passed by access point 130D. In such a case, server 200 may allocate access points 130A, 130B, and 130C under the assumption that it is unlikely that vehicle will return to the area of access point 130D in the near future.

Server 200 may estimate (step 440) download conditions for performing the requested download by the allocated access points 130. The download conditions may then be used to estimate the download capacity for each of the access points 130. For example, access point 130A may be located at an intersection with heavy traffic, effectively slowing vehicle 300 as it passes by. The traffic light may therefore effectively enlarge a potential download window for downloading the request to vehicle 300 as vehicle 300 may stay in range of access point 130A while waiting for the traffic light to change. However, access points 130B and 130C may not be positioned near traffic lights and traffic may flow faster in their vicinity, thereby effectively reducing a potential download window for vehicle 300 as it passes by. It will be appreciated that there may be multiple vehicles 300 receiving downloads from a given access point 130; such a situation also may affect the capacity of the given access point to provide the requested download.

It will be appreciated that the order and representation of steps 430 and 440 may be exemplary. In some embodiments, steps 430 and 440 may be combined as a single step. In other embodiments, the order of steps 430 and 440 may be reversed.

Server 200 may pre-cache (step 450) one or more files representing the requested download at the allocated access point(s) 130. It will be appreciated that the amount of data pre-cached in step 450 may be a function of the download conditions and/or capacity estimated in step 440. It will also be appreciated that where more than one access point 130 has been allocated, the amounts of data to be downloaded by each of the allocated access points 130 may be a function of the results of step 440 as estimated separately for each allocated access point 130.

Server 200 may perform the pre-caching of step 450 using any suitable technology. For example, server 200 may forward the requested download using a high speed Internet connection and/or along a backbone network associated with the mobile network in system 100. It will be appreciated that since the allocated access points may not necessarily be in close proximity to vehicle 300 at the time of the download request, the transmission speed of the pre-caching in step 450 may be less than the speed at which the file(s) will be downloaded to vehicle 300 when it comes into range of an allocated access point 130. For example, using mmWave, access point 130A may be capable of downloading a large file to vehicle in less than ten seconds. However, if access point 130A is, for example, a minute away from vehicle 300 at the time of the download request, server 200 may pre-cache the file(s) for download using a transmission rate that is considerably slower than that provided by mmWave.

It will be appreciated that the use of existing IEEE 802.XX standards in the context of description of the following embodiments may be exemplary; in practice the embodiments described herein may be implemented using any suitable technology that may provide the functionality ascribed herein to transmissions in the mmWave spectrum. As vehicle 300 approaches AP 130A (where AP 130A has received the file(s) for the requested download), AP 130A may transmit 802.11ad/ay compliant frames in small radar bursts in the direction of the vehicle. AP 130A may use these transmissions to identify/authenticate (step 460) vehicle 300. It will be appreciated that AP 130A may also leverage reflection along with Doppler Effect to calibrate/refine the position and movement of vehicle 300. AP 130A may employ a variety of authentication protocols depending on the sensitivity of the data being downloaded and/or the amount of data to download vis-à-vis the expected length of the download window. For public content data (navigation broadcasts, public video or audio feeds), AP 130A may use known WiFi access protocols such as Wi-Fi Protected Access 2-Pre-Shared Key (WPA2/PSK), or equivalent functionality, which entails an 802.11 onboarding process of 50 milliseconds (m/s) or less. If necessary, AP 130A may use fast initial link set up (FILS) authentication to speed up the authentication process.

It will be appreciated that if the requested download is of a more sensitive nature (e.g. car camera data upload, copyrighted infotainment content exchanges), stronger individual user authentication (e.g., Extensible Authentication Protocol over IEEE 802-EAP/802.1X—as per IEEE 802.1X) may be employed in step 460. However, such authentication may consume most of the download window while vehicle 300 passes through the range of transmission for AP 130A. However, IEEE 802.11r ("fast roaming"), for example, may be leveraged to avoid using large parts of the available download window for authentication. For example, car trajectory information may be used to forward keying material, such as a Pairwise Master Key-R1 (PMK-R1) and/or mobility domain information element (MDIE) data to a next targeted AP 130. For example, if per location service 350 vehicle 300 will continue to AP 130B after passing AP 130A, AP 130A may forward the keying material to AP 130B, thereby minimizing the amount of time used by AP 130B to authenticate vehicle 300. Alternatively, or in addition, vehicle 300 may use 802.11r to send a roaming probe and then a re-association message in the direction of AP 130A to proactively initiate authentication.

Alternatively, or in addition, unassociated IEEE 802.11p methods (or similar technology) may be implemented in the context of IEEE 802.11ad/ay, enabling the exchange of data to begin as soon as vehicle 300 may be identified as discussed hereinabove. IEEE 802.11p provides wireless access in vehicular environments (WAVE) support for Intelligent Transportation Systems (ITS) applications, including data exchange between high-speed vehicles and/or between the vehicles and roadside infrastructure, commonly known as V2X communication, in the ITS band of 5.9 GHz (5.85-5.925 GHz). IEEE 802.11p provides for the exchange of data without prior establishment of a basic service set (BSS), exchanging data before the completion of association and authentication procedures. In IEEE 802.11p, the authentication and data confidentiality mechanisms provided by the IEEE 802.11 standard (and its amendments) may be provided by higher network layers.

AP 130A may use mmWave to download (step 470) the pre-cached file(s) for the requested download to vehicle 300. It will be appreciated that it is possible that the requested download may be too large to successfully complete downloading to vehicle 300 in the download window when vehicle 300 is in communication with AP 130A. If the download completes (step 480) process 400 ends. Otherwise, if the download did not complete, process control returns to step 420 where process 400 continues for the remaining portion of the requested download.

As noted hereinabove, system 100 (FIG. 1) may also support uploads from vehicle 300. In accordance with embodiments described herein, process 400 may also be implemented where step 450 may not always be performed and step 470 may support an upload to AP 130A in addition to, or instead of, downloads.

It will also be appreciated that a variety of methods may be used to determine the velocity and/or anticipated/planned trajectory of vehicle 300 in order to anticipate the location(s) and schedule according to which vehicle 300 may pass APs 130. For example, server 200 may use information (e.g., mapping/navigation/tracking/etc.) from location service 350 (FIG. 3) in the performance of steps 420, 430, and 440. It will be appreciated that in some embodiments location service 350 may communicate directly with APs 130 and/or other (possibly more ubiquitous) access technologies that vehicle 300 (or user devices therein) supports. Some information used in steps 420-440, such as, for example, road or traffic conditions, etc. may also be received from third party information sources. An AP 130 may also comprise an antenna array system composed of a multiplicity of small antennas in a compact form factor to perform electronic searching and tracking of vehicles 300.

It will be appreciated that the embodiments described herein may not necessarily be limited to V2I scenarios. For example, the embodiments described herein may also support high speed data downloads to a user's mobile communication device, such as, for example, a smartphone, a laptop computer, a computer tablet, etc. In accordance with an exemplary embodiment, the functionality ascribed herein to vehicle 300 may also be implemented in one or more mobile communication devices of a user. In such an exemplary embodiment, APs 130 may be deployed in an airport, hotel, shopping mall, etc. In such a scenario, other information may be leveraged by server 200 and/or APs 130 to perform steps 420-440.

For example, the mobile communication device may have a step counter application which may be used to estimate speed. In an airport, APs 130 may be deployed at natural "chokepoints" where a user may be expected to slow down or stop, such as, for example, check-in counters, security checkpoints, departure gates, baggage claim, etc. An airline loyalty application may provide the flight number, gate, and departure time for use in steps 420-440. In some embodiments, the airport may even provide integrated support to system 100. For example, a boarding card reader may effectively perform step 460 by uniquely identifying a user's mobile communication device if it is used for boarding.

It will be appreciated that for other scenarios, other sources of information may be leveraged similarly. For example, in a hotel, the room number or a dinner reservation may be used; in a shopping mall, a retail loyalty application and/or credit card use may also provide input to steps 420-440.

Figure 5:
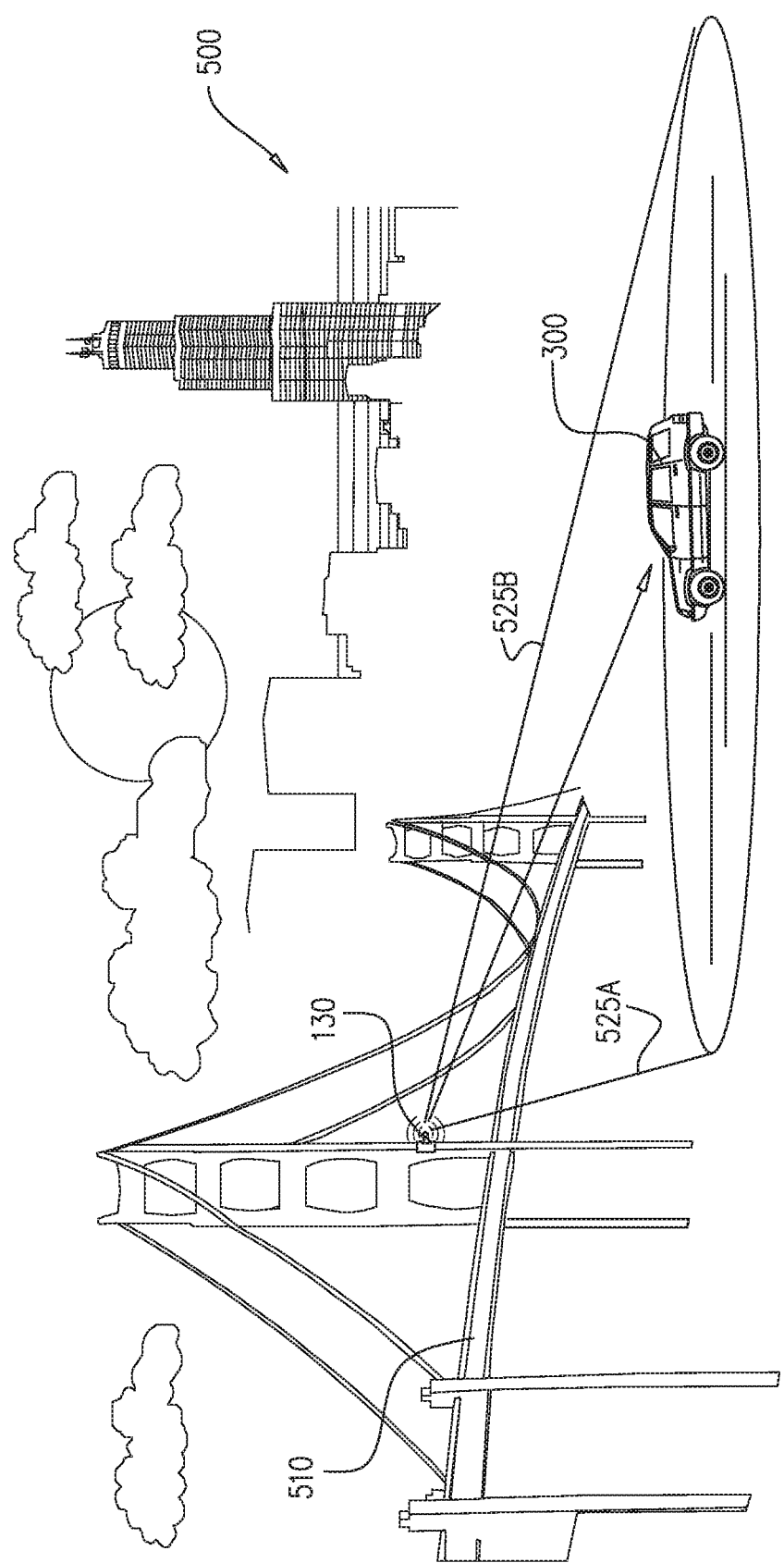
FIG. 5 is a pictorial illustration of part of the exemplary download process of FIG. 4.

Reference is now also made to FIG. 5 which is a pictorial illustration of an exemplary AP deployment 500, constructed and operative in accordance with embodiments described herein. As depicted in FIG. 5, AP 130 may be deployed on bridge 510, towards which vehicle 300 may be approaching. It will be appreciated that if vehicle 300 is moving at a typical highway speed of 65 miles per hour, it may be moving at approximately one hundred feet per second, or 33 m/s. At such speeds, conventional search and tracking algorithms may be inefficient. It will also be appreciated that note that a given AP 130 may simultaneously provide service to dozens of vehicles 300, where each vehicle 300 may be within effective transmission range/angle/line-of-sight for one or two seconds. The service provided by APs 130 deployed in locations where vehicles 300 may be expected to be moving relatively fast (e.g., overpasses and other roadside locations) may therefore be improved by maximizing its connectivity with vehicles 300.

In accordance with embodiments described herein, a camera may be integrated into AP 130 to improve identification (search) and authentication vehicle 300. For example, AP 130 may comprise a high-speed, high-density camera with a fisheye lens that may lie flush on the bottom of the bridge 510. The camera may be operative to detect a visual indication that identifies vehicle 300, e.g., an associated license plate number. Alternatively, the camera may be provided in a separate device in communication with AP 130, using a backbone network or a wireless technology to communicate with AP 130.

It will be appreciated that a camera may detect vehicles from a distance greater than may be reached via mmWave transmission. Accordingly, AP 130 may employ the camera to identify the approaching vehicle 300 before vehicle 300 enters the download window as denoted in FIG. 5 as the range between points 525a and 525B. The camera may therefore be operative to detect and read a license plate number on vehicle 300 prior to vehicle 300 coming into range (i.e., with the download window of points 525A-525B) of mmWave transmission. The license plate number may then be used as input to step 460 (FIG. 4) to begin the identify/authenticate vehicle 300 in order to save more of the download window for actually downloading to vehicle 300. Alternatively, or in addition, in accordance with some embodiments described herein, the camera may be used to proactively identify vehicle 300 before vehicle 300 initiates communication with server 200. In such a case, the camera may send a visual indication of vehicle 300 to AP 130 and/or server 200 in an attempt to identify vehicle 300. Server 200 may use a successful camera-based identification to proactively determine a likely upload/download request and allocate APs 130 to service the upload/download request and/or pre-cache a download request along an expected path for vehicle 300.

In operation, in step 450 (FIG. 4) server 200 may forward the license plate number along with information regarding the relative position and anticipated trajectory of vehicle 300 to AP 130. AP 130 may then use the camera in step 460 to proactively search for vehicle 300 according to the forwarded information position and trajectory information. Once vehicle 300 is identified by the camera, it (or multiple instances of vehicles 300) may also be tracked by AP 130 which may use this visual-based tracking information to minimize the antenna array time used for searching and tracking of one or more vehicles 300. The visual-based tracking information may also be used to determine when vehicle 300 is out of range or in line of sight (LOS), which may be leveraged to determine an initial modulation and coding scheme, and when to stop transmitting.

Alternatively, or in addition, it will be appreciated that an optical modality (e.g., the camera) may lead to an identification before the wireless modality (especially if vehicle 300 is not transmitting at the time). In such a case, a single camera/AP installation may have sufficient time to identify vehicle 300, request content and receive download from server 200, and then transmit to vehicle 300. Relevant use cases for this functionality may include streets with slow traffic patterns and/or near intersections where cars are either moving slowly or stopped. Or highways when there is slow traffic. It will be appreciated that this functionality may also be leveraged to provide the same content to multiple vehicles 300, such that the time required for pre-caching the content may not be relevant for a second vehicle.

It will be appreciated that a camera, integrated or otherwise, may provide similar functionality for non-vehicle embodiments, such as described hereinabove with respect to a user with a mobile communication device in moving around a given environment such as an airport, a hotel, a shopping center, etc. In such embodiments, the camera may be operative to detect other visual indications that may identify the user, e.g., facial features. For example, AP 130 may use the camera to perform facial recognition of the user as he/she walks through an airport/hotel/shopping center/etc. with spatially separated mmWave-based APs.

Figure 6:
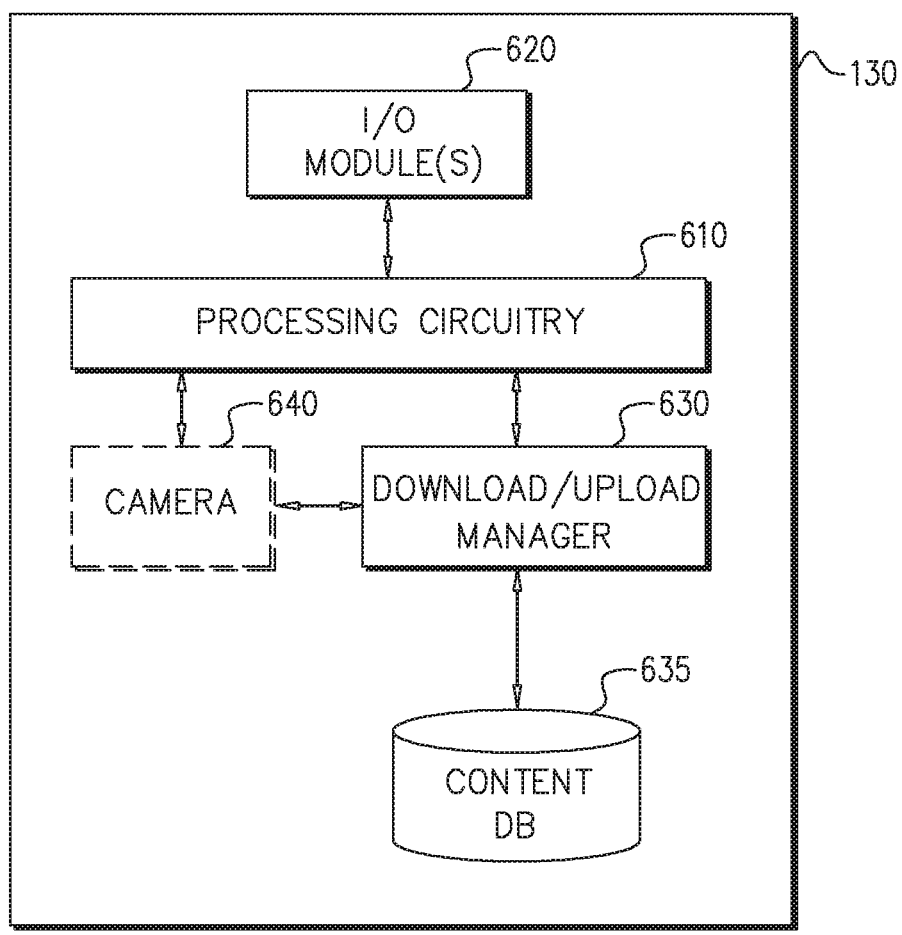
FIG. 6 is a block diagram of an access point used in the system of FIG. 1.

Reference is now also made to FIG. 6 which is a block diagram of an exemplary AP 130, configured and operative in accordance with embodiments described herein. AP 130 comprises processing circuitry 610, input/output (I/O) module 620, download/upload manager 630, and content database 635. Download/upload manager 630 and content database 635 may be implemented using any suitable memory for storing software and/or operational data, such as an optical storage medium, a magnetic storage medium, an electronic storage medium, and/or a combination thereof. It will be appreciated that the memory, or parts thereof, may be implemented as a physical component of AP 130 and/or as a physical component of one or more secondary devices in communication with AP 130. It will be appreciated that in the interests of clarity, while AP 130 may comprise additional components and/or functionality, such additional components and/or functionality are not depicted in FIG. 6 and/or described herein.

Processing circuitry 610 may be operative to execute instructions stored in the memory. For example, processing circuitry 610 may be operative to execute download/upload manager 630. It will be appreciated that processing circuitry 610 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that AP 130 may comprise more than one instance of processing circuitry 610. For example, one such instance of processing circuitry 610 may be a special purpose processor operative to execute download/upload manager 630 to provide high-speed downloads from content database 635 to vehicles 300 within the context of system 100 as discussed with respect to FIG. 1.

I/O module 620 may be any suitable software or hardware component such as a modem or transceiver that may be operative to use protocols such as are known in the art to communicate either directly, or indirectly, with at least server 200 and/or vehicle 300. For example, I/O module 620 may be operative to use some or all of a backbone network, the Internet, etc. to communicate with server 200. I/O module 620 may also be operative to use mmWave and/or other WiFi-based standards to communicate with vehicles 300. It will be appreciated that in operation I/O module 620 may be implemented as a multiplicity of modules, where different modules may be operative to use different communication technologies. I/O module 620 may also comprise an antenna array system composed of a multiplicity of small antennas in a compact form factor to perform electronic searching and tracking of vehicles 300.

It will also be appreciated that the embodiments described herein may also support configurations where some or all of the communications between I/O module 620 and elements of system 100 are brokered by a local server in system 100; at least some of the functionality attributed herein to AP 130 may be also performed on such a local server.

In accordance with some embodiments described herein, AP 130 may also comprise, or at least be associated with camera 640 which may be employed by AP 130 to identify and/or track vehicles 300 as described hereinabove with respect to FIG. 5.

It will be appreciated that the embodiments described herein may provide means for efficiently transferring large amounts of data and/or content to/from users/devices/vehicles even when a coverage area of the deployed wireless access is non-ubiquitous, consisting of disconnected islands or clusters of access points where the coverage is significantly less than 100%. For data downloads, the data may be pre-cached using known means for data transfer in smart upload/download stations operating at mmWave frequencies along anticipated routes for the users/devices/vehicles. The pre-cached data may therefore provide a just-in-time, just-in-place solution for high-speed download of the data when a target user/device/vehicle comes into range of a smart upload/download station.

In summary, the embodiments described herein may provide at least the following functionality:

Tracking of vehicle 300 (or a user's mobile communication device) from one AP 130 to another, including specifically determining and/or predicting which AP 130 and/or APs 130 will be the next encountered by vehicle 300 (or the user's mobile communication device). For example, server 200 may make such a determination/prediction based upon information from location service 350 (e.g., a navigation system), from traffic conditions, and/or from tracking of the user's trajectory. In accordance with some embodiments described herein, server 200 and/or vehicle 300 may also store a device profile and/or movement history; the device profile and/or movement history may also be used to predict where to begin pre-caching the requested download.

Estimating when vehicle 300 (or a user's mobile communication device) may encounter the closest target AP(s) 130, based upon data such as present speed, their projected route, and the traffic conditions along a predicted path to the target AP. For example, server 200 may use the results of this estimating to determine how much time it has to pre-cache the download file(s) at the target AP(s) 130.

Estimating how long vehicle 300 (or a user's mobile communication device) is likely to be associated with the next target AP(s) 130, based upon data such as the traffic conditions in the vicinity of a given target AP 130. For example, server 200 may use the results of this estimating to determine how content may be pre-cached at the given target AP 130.

Estimating how many other vehicles/devices may also be simultaneously connected at the target AP(s) 130 at the time of content delivery, i.e., estimating the impact of multi-user contention. Server 200 may use this results of this estimating to adjust the amount of content to pre-cache at a given target AP 130.

Employing a camera on, or with AP 130 to identify vehicle 300 (or a user's mobile communication device) at is approaches the target AP 130 via the license plate and linked tracking applications (or other methods based on identifying a mobile communications device), to avoid using the download window for identification/authentication.

Reassessing the download condition after the target AP 130 is out of range for assistance in determining what data remains to be preloaded at and delivered from the next target AP 130.

It will be appreciated that the system and method described herein with respect to mmWave transmission may also support alternative embodiments where an alternative high-speed, narrow-beamed, short-range transmission technology may be used.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A method comprising:
   receiving a download request from a mobile device;
   predicting a route for the mobile device based, at least in part, on a current location of the mobile device;
   forwarding one or more files for the mobile device to at least one wireless access point along the predicted route for the mobile device;
   receiving, by the at least one wireless access point, keying material associated with the mobile device prior to the mobile device being within wireless transmission range of the at least one wireless access point;
   authenticating, by the at least one wireless access point, the mobile device based on the keying material; and
   transmitting, by the at least one wireless access point, at least a portion of at least one file of the one or more files to the mobile device in a millimeter wave transmission when the mobile device is within the wireless transmission range of the at least one wireless access point, wherein the transmitting begins prior to completion of the authenticating.

2. The method of claim 1, wherein the authenticating begins prior to the mobile device being within range of the millimeter wave transmission transmitted by the at least one wireless access point.

3. The method of claim 1, further comprising:
   receiving, by the at least one wireless access point, a roaming probe from the mobile device to begin the authenticating.

4. The method of claim 1, wherein the mobile device is integrated into a vehicle.

5. The method of claim 1, further comprising:
   allocating a plurality of wireless access points, including the at least one wireless access point, to receive the one or more files based on the predicted route for the mobile device.

6. The method of claim 1, further comprising:
   estimating a download capacity of the at least one wireless access point.

7. The method of claim 6, wherein the forwarding is based, at least in part, on an estimated download capacity of the at least one wireless access point.

8. The method of claim 1, further comprising:
   determining, by the at least one wireless access point, that the transmission of the at least one file to the mobile device was not completed;
   forwarding at least a remaining portion of the at least one file to at least one other wireless access point; and
   transmitting, by the at least one other wireless access point, at least a portion of the remaining portion of the at least one file to the mobile device.

9. The method of claim 1, wherein the predicted route is based additionally on route information received from the mobile device.

10. The method of claim 1, further comprising:
    receiving, by the at least one wireless access point, an upload transmission of at least one file from the mobile device.

11. A non-transitory computer program product encoded with instructions that, when executed by a processor, cause the processor to perform operations, comprising:
    receiving a download request from a mobile device;
    predicting a route for the mobile device based, at least in part, on a current location of the mobile device;
    forwarding one or more files for the mobile device to at least one wireless access point along the predicted route for the mobile device;
    receiving, by the at least one wireless access point, keying material associated with the mobile device prior to the mobile device being within wireless transmission range of the at least one wireless access point;
    authenticating, by the at least one wireless access point, the mobile device based on the keying material; and
    transmitting, by the at least one wireless access point, at least a portion of at least one file of the one or more files to the mobile device in a millimeter wave transmission when the mobile device is within the wireless transmission range of the at least one wireless access point, wherein the transmitting begins prior to completion of the authenticating.

12. The non-transitory computer program product of claim 11, wherein the authenticating begins prior to the mobile device being within range of the millimeter wave transmission transmitted by the at least one wireless access point.

13. The non-transitory computer program product of claim 11, further comprising instructions that, when executed by the processor, cause the processor to perform operations, comprising
receiving, by the at least one wireless access point, a roaming probe from the mobile device to begin the authenticating.

14. The non-transitory computer program product of claim 11, further comprising instructions that, when executed by the processor, cause the processor to perform operations, comprising:
allocating a plurality of wireless access points, including the at least one wireless access point, to receive the one or more files based on the predicted route for the mobile device.

15. The non-transitory computer program product of claim 11, further comprising instructions that, when executed by the processor, cause the processor to perform operations, comprising:
estimating a download capacity of the at least one wireless access point.

16. The non-transitory computer program product of claim 15, wherein the forwarding is based, at least in part, on an estimated download capacity of the at least one wireless access point.

17. A system comprising:
at least one memory for storing instructions; and
at least one processor for executing the instructions, wherein executing the instructions causes the system to perform operations, comprising:
receiving a download request from a mobile device;
predicting a route for the mobile device based, at least in part, on a current location of the mobile device;
forwarding one or more files for the mobile device to at least one wireless access point along the predicted route for the mobile device;
receiving, by the at least one wireless access point, keying material associated with the mobile device prior to the mobile device being within wireless transmission range of the at least one wireless access point;
authenticating, by the at least one wireless access point, the mobile device based on the keying material; and
transmitting, by the at least one wireless access point, at least a portion of at least one file of the one or more files to the mobile device in a millimeter wave transmission when the mobile device is within the wireless transmission range of the at least one wireless access point, wherein the transmitting begins prior to completion of the authenticating.

18. The system of claim 17, wherein the authenticating begins prior to the mobile device being within range of the millimeter wave transmission transmitted by the at least one wireless access point.

19. The system of claim 17, wherein executing the instructions causes the system to perform further operations, comprising:
receiving, by the at least one wireless access point, a roaming probe from the mobile device to begin the authenticating.

20. The system of claim 17, wherein executing the instructions causes the system to perform further operations, comprising:
allocating a plurality of wireless access points, including the at least one wireless access point, to receive the one or more files based on the predicted route for the mobile device.

* * * * *